Figure 1:
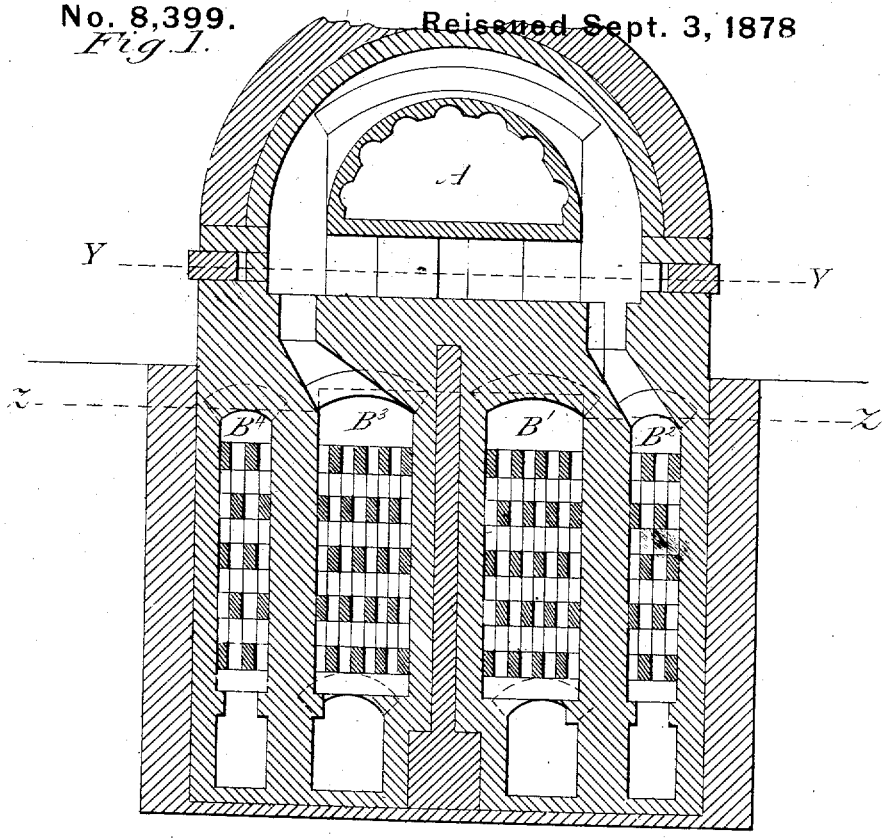

4 Sheets—Sheet 1

F. SIEMENS.

Hardening, Tempering and Pressing Glass.

No. 8,399. Reissued Sept. 3, 1878

Attest:
W. A. Redmond
J. E. Johnson

Inventor:
F. Siemens by
A. Wheatman
atty

F. SIEMENS.

Hardening, Tempering and Pressing Glass.

No. 8,399. Reissued Sept. 3, 1878.

Attest:

W. A. Redmond

J. T. Johnson

Inventor:

F. Siemens by

A. W. Lehman

Atty.

F. SIEMENS.

Hardening, Tempering and Pressing Glass.

No. 8,399. Reissued Sept. 3, 1878.

Attest:
W. A. Redmond
J. T. Johnson

Inventor:
F. Siemens by
C. A. Whitman

F. SIEMENS.

Hardening, Tempering and Pressing Glass.

No. 8,399. Reissued Sept. 3, 1878.

*Attest:*

W. A. Redmond

J. T. Johnson

*Inventor:*

F. Siemens by

A. Whitman

Atty

UNITED STATES PATENT OFFICE.

FREDERICK SIEMENS, OF DRESDEN, GERMAN EMPIRE.

IMPROVEMENT IN HARDENING, TEMPERING, AND PRESSING GLASS.

Specification forming part of Letters Patent No. 192,537, dated June 26, 1877; Reissue No. 8,399, dated September 3, 1878; application filed June 13, 1878; patented in England, December 3, 1875.

DIVISION A.

*To all whom it may concern:*

Be it known that I, FREDERICK SIEMENS, of Dresden, in the German Empire, have invented a new manufacture consisting of glass capable of resisting fracture on impact, of which the following is a specification:

In order that my improved manufacture may be clearly distinguished from those heretofore known, I will refer to the state of the art of manufacturing glass as it existed prior to my invention.

When glass is melted and shaped into articles which are allowed to cool in the air, it becomes too brittle for any practical use, as the exterior cools first and forms a contracted crust, which shelters the interior particles. If, however, the glass is placed in a hot oven and allowed to cool slowly, the particles appear to assume a condition of more perfect equilibrium of cohesive force, so that the glass becomes more elastic. The process of annealing, therefore, has long been known as a very essential operation in the manufacture of glass.

It has been alleged that window-glass of uniform thickness may be manufactured by pressing the melted glass between two parallel and polished plates of cast iron or steel until the desired thickness is obtained, or by pouring the melted glass between two parallel and polished plates and submitting it to pressure from without; but it is not claimed for these processes that they change in any way the physical properties of the glass or render it more capable of resisting fracture on impact.

It has been alleged that glass may be hardened by placing it in platinum molds, fusing or nearly fusing it, and then suddenly depriving it of its caloric by frigorific mixtures; but it is not claimed that this treatment imparts to the glass abnormal powers of resisting a disruptive force.

It has been alleged that glass may be rendered less fragile by immersing it in a highly-heated state in a bath of oils, grease, wax, resinous or bituminous substances, the boiling temperature of which is above the boiling temperature of water; but articles treated by this process must be finished before the treatment, which has for its object the strengthening of the glass, can be proceeded with, which renders them liable to be deformed.

Objections have also been urged against the glass strengthened by this process that although it may possess enhanced powers of resisting the initial effort of a disruptive force, still, when a slight fracture takes place, its molecular organization goes to ruin, and it becomes almost entirely disintegrated.

Having thus reviewed the state of the art to which my invention relates, I will state that the invention protected by these Letters Patent is a new manufacture, which cannot be produced by any one of the processes hereinbefore described, and which consists of glass subjected, while in a heated condition, to pressure in or between molds for the purpose of rendering it capable of resisting fracture on impact or fracture caused by sudden variations of temperature.

When the articles are such as are usually molded, I effect the strengthening thereof at the same time with their pressing, so as to produce a tough-pressed glass by the use of molds of metal or other suitable material, in which the glass articles, after having been completely shaped, and while they are in a highly-heated condition, are squeezed, the molds having the effect of giving the necessary cooling without having recourse to a liquid bath.

The material employed for such molds will depend upon the nature and thickness of the glass to be operated upon. In cases where the cooling has to be effected rapidly, metals of good conducting-power—such as copper—are to be preferred, and in cases where the cooling has to be effected more gradually, molds of earthenware or other materials that are bad conductors of heat may be used.

Again, in cases where the glass articles operated upon vary in thickness, the conductivity of the different parts of the mold is varied accordingly, either by making thicker those parts of the mold which come next to the thickest parts of the glass, so as to absorb a greater amount of heat, or by making those parts of better conducting material than the parts next the thin portions of the glass. The molds will also have to be maintained at a certain temperature, varying according as the nature of the glass to be operated upon requires that they should be cooled to a greater or less degree.

It will generally be found sufficient to employ cast-iron molds that are maintained at the temperature of boiling or warm water and earthenware molds that are kept quite cool.

The glass articles, after having been wholly shaped, are placed in a heating-oven, in order to be raised to the requisite degree of heat for being subjected to the above-described pressing and cooling process; and as many glass articles, when subjected for a length of time to a high temperature, such as would be necessary in the present case, are apt to get out of shape, I prefer in such cases to inclose them, before placing them in the heating-oven, in a casing or shell of platinum, which supports the glass and prevents it from getting out of shape while in the heating-oven, the glass article with the platinum shell upon it being then placed in the mold for the pressing and toughening process.

The heating-ovens employed may be of any suitable known construction; but it is preferable to use ovens heated by gaseous fuel, in order to prevent the purity of the glass from being impaired.

Figure 4:
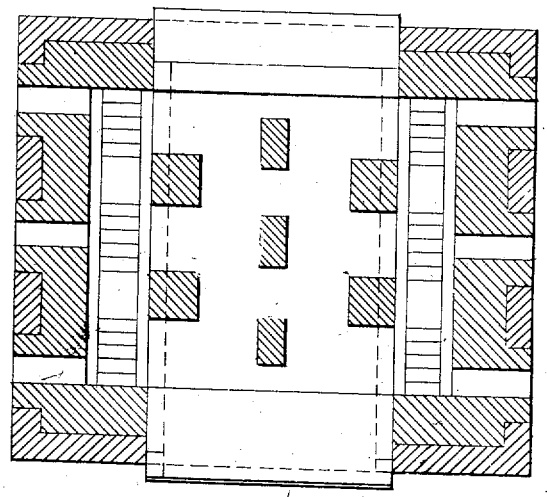
Figure 2:
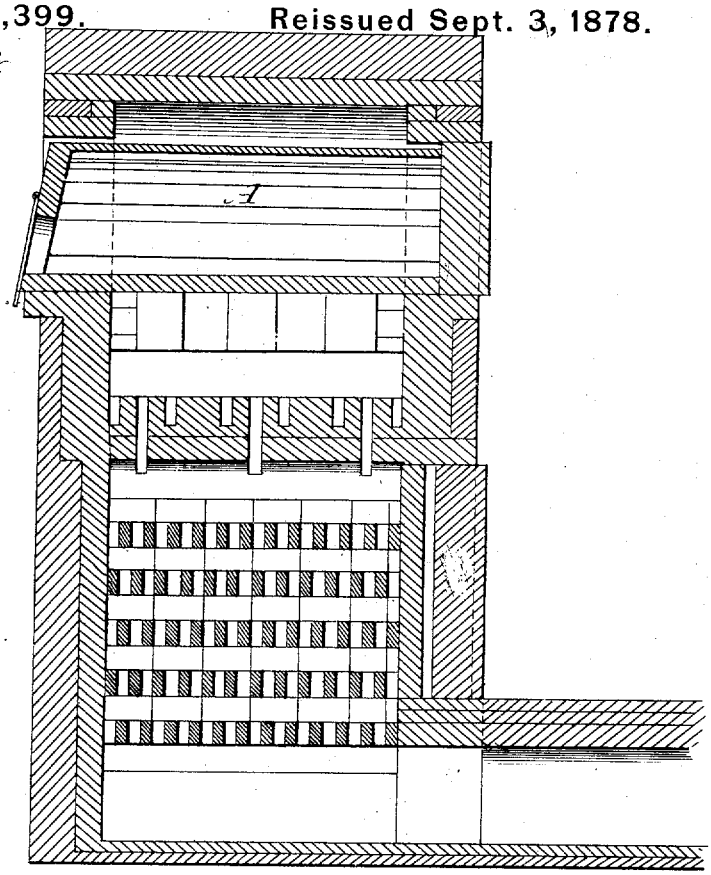
Figure 5:
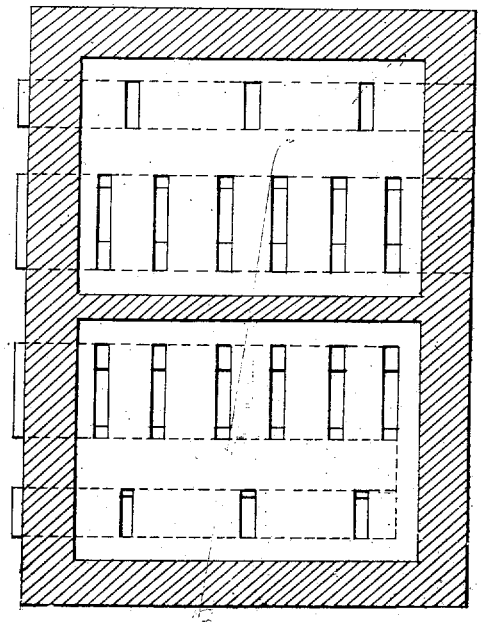
Figure 6:
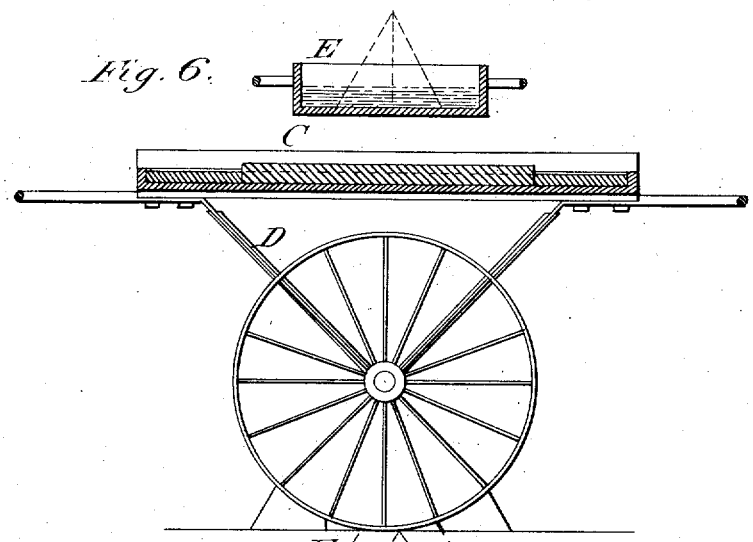
Figure 3:
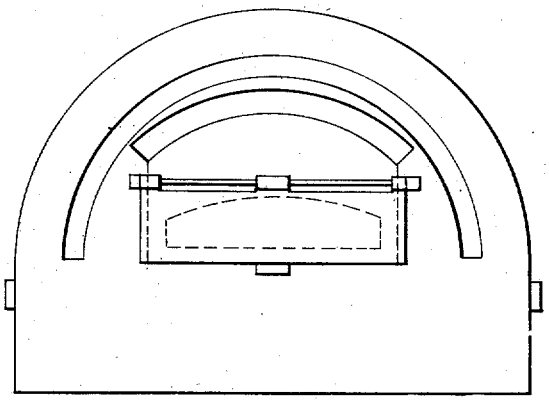

In the accompanying drawings, in which corresponding parts are designated by similar letters, Figure 1 represents a transverse, and Fig. 2 a longitudinal, section of a regenerative gas muffle oven suitable for heating the glass articles that are to be treated according to my invention. Fig. 3 is a front view of this oven. Figs. 4 and 5 are sectional plans on the lines *y y z z* of Fig. 1, respectively. Fig. 6 is a side view, Fig. 7 an end view, and Fig. 8 a plan, of a pair of pressing-molds and carriages, such as may be conveniently employed in the process.

The muffle A is heated, both under its floor and over its crown, by the flame of the gas and air from the one pair of regenerators, $B^1$ $B^2$, and the heated products of combustion pass off through the other pair of regenerators, $B^3$ $B^4$, till, the first pair being sufficiently cooled and the second pair sufficiently heated, the direction of the currents is reversed for alternate working in the usual manner. The muffle A being completely closed in, the glass articles heated in it are protected from dust and other impurities, such as in an open oven are apt to settle on the softened glass and damage its surface.

Figure 7:
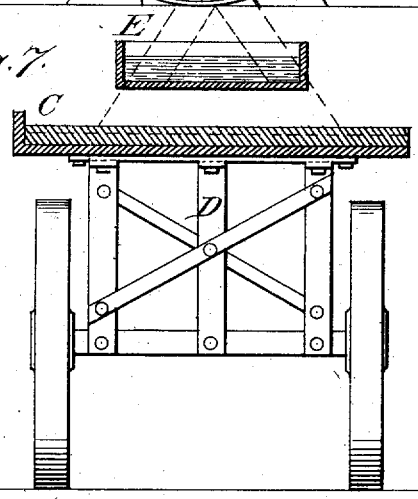
Figure 8:
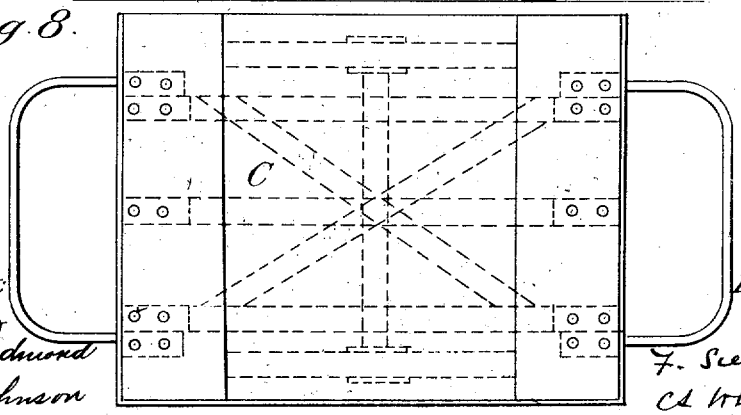

The lower mold, C, placed on the truck D, receives the heated glass from the oven, and the truck is then run under the upper mold, E, which is let down upon it, being loaded, when necessary, to give the desired pressure. The molds shown in Figs. 6 and 7 are suited to flat glass plates. For glass articles of other shapes the molds are made of suitable form, as shown in Fig. 9, where C is a hollow or concave lower mold, with a glass plate, *p*, resting on it by its edges, and *e* is a corresponding convex upper mold, which, being lowered on the glass *p*, presses it down into the lower mold, the glass being thus at the same time pressed and toughened by the cooling influence of the molds.

Figure 9:
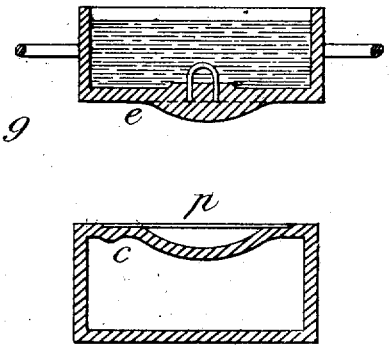

The temperature of the molds may be kept at the required point by charging them with liquid, as shown, with respect to the upper molds, in Figs. 6, 7, and 9. Usually water serves for this purpose, the temperature of its boiling-point being well suited for giving the required toughening.

Having thus described my invention, I claim and desire to secure by Letters Patent of the United States—

A new manufacture consisting of glass which has been subjected while in a heated condition to pressure in or between molds, for the purpose of rendering it capable of resisting fracture on impact or fracture caused by sudden variations of temperature, as herein described.

In testimony that I claim the foregoing I have hereunto set my hand and seal.

FREDERICK SIEMENS. [L. S.]

Witnesses:

LÉON KLEMPERER,

PAUL DRUCKMÜLLER.